Nov. 26, 1940.                F. ZUGER                2,222,827
                    TONGUE THROW FOR IMPLEMENT CARTS
                      Filed Feb. 28, 1938          3 Sheets-Sheet 1
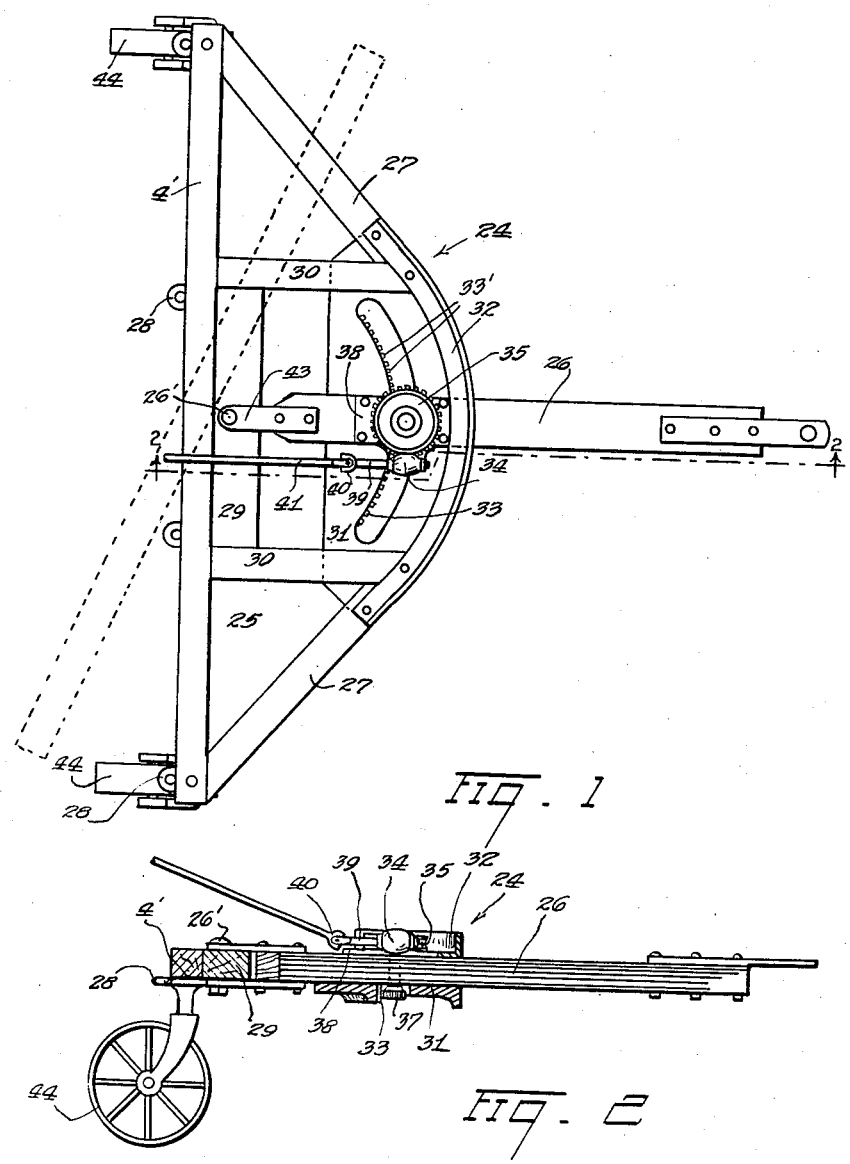
INVENTOR
BY *Frank Zuger*
ATTORNEY

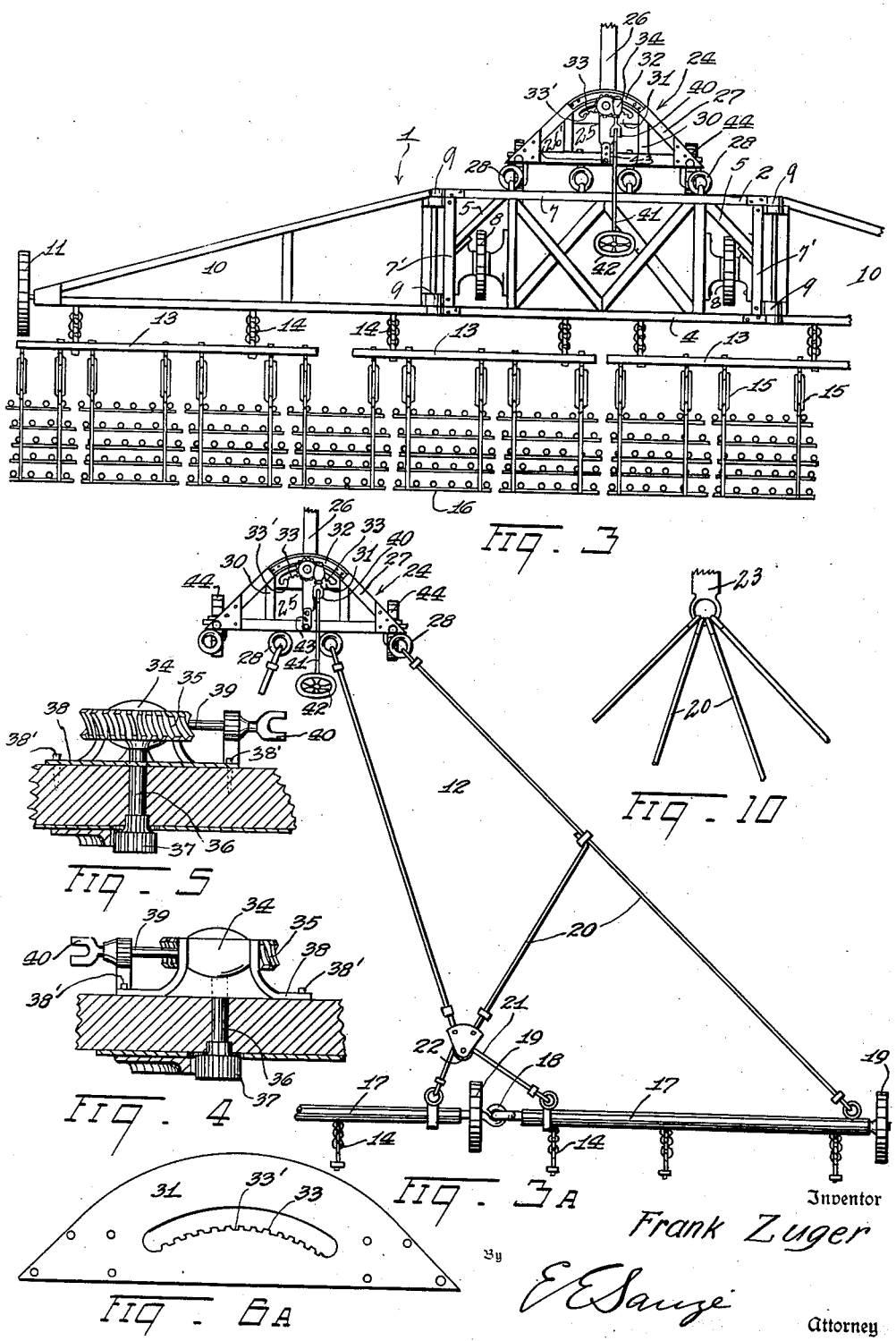

Nov. 26, 1940.     F. ZUGER     2,222,827
TONGUE THROW FOR IMPLEMENT CARTS
Filed Feb. 28, 1938     3 Sheets-Sheet 3
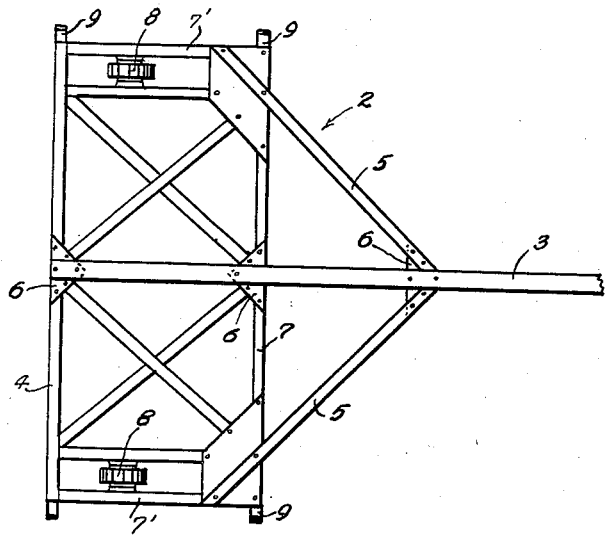
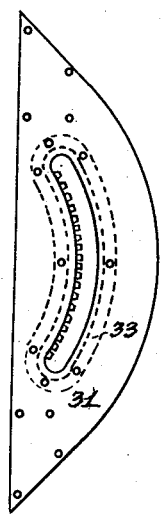
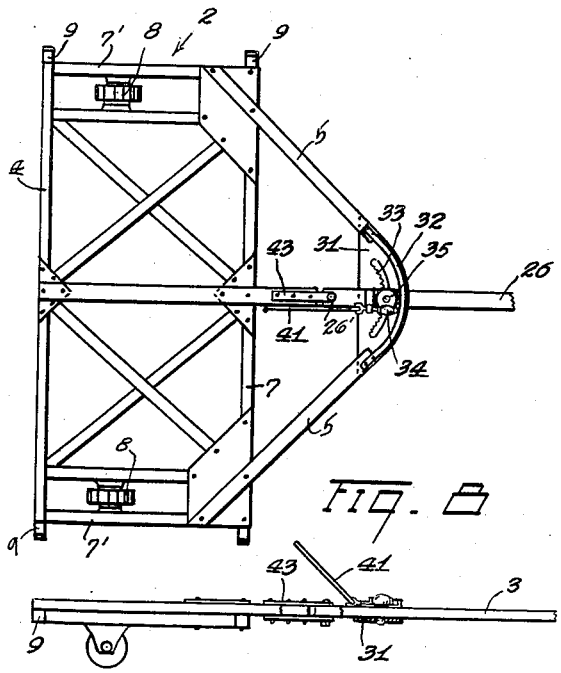
INVENTOR
Frank Zuger
BY
ATTORNEY Patented Nov. 26, 1940

2,222,827

UNITED STATES PATENT OFFICE 2,222,827

TONGUE THROW FOR IMPLEMENT CARTS

Frank Zuger, Waitsburg, Wash., assignor of one-half to Elmo J. Tuttle, Waitsburg, Wash.

Application February 28, 1938, Serial No. 193,116

3 Claims. (Cl. 97—234)

This invention relates to tongue throws for implements and has as one of its objects to provide means whereby the angle of inclination of the implement may be changed with respect to the direction of travel, more particularly on side hills, and without having to stop the implement.

Another object of the invention is to provide a mechanism, that may be readily attached either directly to the implement or through the medium of a draft means, provide a pilot truck adapted to be secured to the draft means, or that may be applied to a typical platform cart and convert a cart of the rigid tongue type into one of a movable tongue type.

A further object of the invention is to provide a pilot truck having a movable tongue that may be actuated manually from a forward or rearward position.

A further object of the invention is to provide a gear segment adapted to provide and substitute a rounded apex of a typical platform cart at small comparative expense.

With these and other objects in view reference is now had to the accompanying drawings in which Fig. 1 is a plan view of my preferred form of pilot truck with tongue throw incorporated therewith;

Fig. 2 is a sectional elevation of said pilot truck taken on the line 2—2 of Fig. 1, and showing my preferred form of cast gear segment;

Fig. 3 is a plan view of the pilot truck showing its application to an implement through the medium of a wing cart draft means (both fragmentary);

Fig. 3A is a plan view of the pilot truck showing its application to a cable drawn draft means;

Fig. 4 is a side elevation (enlarged) of the worm and worm gear combination of the tongue throw as arranged for operation from the rear;

Fig. 5 is a like view of the combination arranged for operation from the front;

Fig. 6 is a plan view of a modification of the gear segment showing the segment applied to a plate;

Fig. 6A is a modification of Fig. 6 representing the segment as integral with the plate, the plate being cut to provide the teeth therein;

Fig. 7 is a plan view of a typical platform cart showing a fixed tongue;

Fig. 8 is a modification of the showing in Fig. 7 showing a reconstructed cart having a substituted swinging tongue;

Fig. 9 is a side elevation of Fig. 8 showing the normal position of its vehicle wheels; and Fig. 10 is a plan view of a fragment of the cables and showing a typical means of direct connection to a tractor (not shown).

The device which forms the subject matter of this invention is shown and described as adapted for use in connection with typical draft means as used with farm implements, (the implement being represented herein by a fragment of a harrow) and showing its adaptability for attachment to an implement through the medium of the draft means, represented in Fig. 3 by a fragment of a typical wing cart, and in Fig. 3A by a fragment of a typical cable drawn cart, both of these views showing the simplicity with which the device, which is of the nature of a pilot truck, may be attached thereto.

These two means for propelling the implement and distributing the load to the power source are typical in that all hitches terminate at a more or less central point forwardly for connection to draft means, Fig. 10 representing the present day type of connection of a cable drawn draft means.

With this explanation reference will now be had to the accompanying drawings in which like numerals will refer to like parts throughout the several views and the numeral 1 will refer to a draft hitch, of the nature of a wing cart, which will now be explained.

The wing cart has as one of its elements a generally triangular platform or hitch cart 2, (shown in Fig. 7) and is provided with a forwardly extended tongue 3 rigidly secured thereto by a suitable securing means attaching the rear end of the tongue to the rear member 4 of this cart 2, the forward part of the tongue being braced by diagonal members 5 secured to the tongue by any suitable means by the plates 6. The rear end portions of the diagonal member 5 are secured to the forward member 7 of the cart and extended diagonally across the forward corners of the cart with their rear extremities secured to the end pieces 7' of the cart.

Obviously, a platform (not shown) may be constructed on the cart for the operator to stand on if desired.

This platform cart 2 is supported at either end by wheels 8, its forward end being supported by a tractor or the like (not shown), whereby a three point support is provided.

In large work the platform cart is further provided at each end with hinges 9 to which wings 10 are hingedly attached as shown in Figure 3, and while the platform cart will support the inner ends of the wings (by means of its wheels 8), the outer ends of the wings will be supported by wheels 11, thus providing a flexible wing car having pivoted side extensions.

Sectional draw bars 13 are secured to the platform cart, and the wings, preferably by chains 14, with links 15 securing the draw bars to the implements 16.

Where a draft hitch 12 is cable drawn, as shown in Figure 3A, the hitch will consist, in addition to the cables, of sections, generally of pipe or bars represented as at 17, the sections being joined together by a simple universal joint 18, and supported at each joint, and the outer end, by wheels 19.

The cable drawn hitch, indicated as at 12, is likewise provided with sectional draw bars 13 to which the implements 16 are secured in the same manner as those described for the said wing cart shown in Figure 3.

This cable drawn hitch is drawn by a plurality of cables 20 extending from the ends of the adjoining sections 17 to which they are connected by a short piece of cable 21 which spans the wheel 19 between these sections, and in which looped cable is mounted a pulley 22 to which in turn is connected rear ends of certain of the forwardly extended cables. The outside one of the cables is connected directly to the outer end of a pipe 17 in the usual manner.

The inner and outer cables 20 which converge forwardly terminate, in the usual practice, as above mentioned in the ringed draw bar 23, or other suitable connecting means (not shown), whereby the hitch 12 is attached to the power source at the apex of the triangle formed by the said cables and the draw bars 17.

It is now obvious that the implements drawn by the hitches above described will follow directly in line with the tractor when operated on level ground, however, on hilly ground the natural tendency is for the implement to slide down hill about the point of connection to the tractor due to the effect of gravity, resulting in an imperfect farming operation.

To overcome this effect a pilot truck 24 is preferably utilized and this pilot truck will now be described.

The pilot truck consists preferably of a generally triangular frame 25 provided with a brace member 29 and a base member 4', as shown in Figure 1, to either of which may be attached a laterally swingable tongue 26 pivotally mounted by means of a pivot pin 26'.

The diagonal members 27 of the pilot truck preferably correspond in angle with the angle of the diagonal members 5 of the platform cart 2 and, therefore, may be readily attached to said cart diagonals with a minimum of alteration and in a manner to be explained.

By the addition of rings or eye bolts 28, secured to the rear member 4', the pilot truck is adapted to connect with the cable drawn hitch 12 by simply transferring the cable ends from their original ring to the respective rings 28 of the pilot truck as shown in Figure 3A.

The pilot truck 24 is very effectively braced by the transversely disposed brace member 29 parallelling the rear member 4' and by the two longitudinally disposed members 30 which brace the diagonal members 27 and also engage ends of the transverse brace member 29.

The operating mechanism of the device is designed to throw the tongue from side to side and in order to do so there has been provided a slotted plate 31 rigidly carried by the pilot truck. This plate may be firmly secured to the pilot truck diagonals 27, beneath the tongue, as shown in Fig. 1. As shown in plan in Fig. 6, a gear segment 33 may be secured to the under side of the plate, or the gear segment may be formed integral with the plate as shown in Fig. 6A. Since the plate is made relatively thin it is adapted to be secured to the under side of the diagonals, or between timbers, as the case may be, and thus provide a secure brace between the two diagonals of the pilot truck and the longitudinally disposed bracing members 30 before mentioned. The plate also serves as a guide and support for the tongue during sliding movement of the tongue transversely therein.

The thickness of the lumber used in constructing the pilot truck will determine the space necessary for the tongue 26 between the plate 31 and a guide rail 32 secured to the top of the diagonals 27 in bridging relation thereto and together with the plate 31 forming a guide or channel therebetween to confine the said tongue against vertical play.

The plate 31 is slotted on a curve, the distance from the center of the pivotal point of the tongue properly determining the curvature of the gear segment 33 provided for by the said curve. As previously explained, the gear segment may consist of a cast segment riveted, or otherwise secured to the plate, as shown in Fig. 6, and serve as a reinforcement for the plate, or the segment and plate may be formed in one piece as shown in Figure 6A, wherein the plate is cut to provide teeth 33' forming a segmental sack extending along the rear side edge of the slot.

A worm 34 and worm gear 35, shown in combination, are mounted on and carried by the tongue 26, and the shaft 36 of the worm gear projects downward, preferably through the tongue, and is provided on its lower end with a pinion 37 turning with the shaft and meshing with the gear segment 33.

The worm and worm gear combination is secured to the tongue by means of a plate 38 which may be termed a "foundation" plate and which, by properly spacing the securing bolts 38' in the foundation plate, may be removed and the plate reversed so that the driving shaft 39 of the worm may operate to rotate the worm gear from a forward position as shown in Figure 5 or a rearward position as shown in Figure 4.

A universal joint 40 is secured to the shaft 39 and is intended to be connected with an operating shaft 41 which in turn is disposed to operate the worm and worm gear combination. This shaft may project forwardly or rearwardly as above described, and may be provided at its free end with a hand wheel 42, as shown in Fig. 3, or with a crank (not shown) whereby the worm wheel may be rotated to optionally move said tongue transversely in an arc about said pivot and in said channel.

By comparing Figures 7 and 8 it will be seen that the platform cart, shown in Figure 7, may be reconstructed to form the pilot truck shown in Figure 8 by securing the plate member 31 to the diagonal members 5 thereof and removing the surplus lumber. Then by substituting the movable tongue 26 of Figure 8, and its mechanism, for the forward portion of the fixed tongue 3 of Figure 7, and pivotally connecting the movable tongue to the remaining part of the fixed tongue by means of the link 43 and pin 26', the original material of the cart may be utilized to provide a relatively inexpensive movable tongue construction.

The pilot truck when constructed as shown in Figure 1 is provided with supporting caster wheels 44, and when it is constructed as shown in Figure 8, it is supported by the wheels 8.

The tractor (not shown) is secured to the tongue in any suitable manner and through this means the implement, when drawn by the tractor, will follow the tractor in the manner as above mentioned.

Where the farming operation must be conducted on side hills, and it will be assumed that the high side of the hill is on the left, the obvious tendency of gravity will be to pull the cart and implements down hill. This tendency is counteracted by rotating the worm by means of its hand wheel and the cart and implements will be moved to a line perpendicular to the lines represented by the dotted lines in Fig. 1, whereby the tendency of the cart and implements will be to hold up on the side hill and thereby provide for perfect operation.

Obviously the tongue may be moved in either direction with respect to the line of travel, and consequently the device is equally applicable to uneven or hilly ground, on either side, and by operation of the worm and gear combination the implement can be drawn in a perfect path to follow the tractor, without "tracking."

Having thus described my invention I claim:

1. In a tongue throw for implements, a pilot truck comprising a generally triangular frame, means to secure said truck to an implement, a laterally swingable tongue having its rear end pivotally attached to said frame, a slotted plate member rigidly secured at the front of said truck and serving to provide a rounded apex for the frame and constituting a brace for said frame, a gear segment carried by said plate and extending along the slot thereof, a reversely positionable operating mechanism carried by said tongue and including a rotatable shaft and a depending pinion carried thereby for engaging said segment, and means to operate said mechanism in either of its positions.

2. In a tongue throw for implements, a cart having forwardly extended diagonally positioned members rigidly attached thereto and converging forwardly to form therewith a triangle, a tongue pivotally attached at one end to said cart and disposed between said members, a plate extending between said members and rigidly secured to the members and providing a rounded apex for said triangle and serving as a support for the free end of said tongue, a gear segment associated with said plate, a reversely positionable operating mechanism secured to said tongue and including a rotatable shaft and a pinion carried by the shaft for meshing with said segment to impart lateral swinging movement to the tongue about its pivot when the shaft is rotated, and means to operate said mechanism and impart rotary motion to the shaft in either position of the reversely positionable mechanism.

3. In a tongue throw for implements, a cart having forwardly extending bars rigid therewith and converging forwardly to provide a substantially triangular structure, a tongue pivoted at its rear end to said cart and extending forwardly between said bars, a plate extending between said bars under said tongue to support the tongue and rigidly secured to the bars, said plate having a rounded front edge and providing a rounded apex for the triangular structure, a guide strip carried by said bars and extending along the front edge of the plate over the tongue to hold the tongue upon the plate, said plate being formed with an arcuate transverse slot concentric with the pivoted rear end of the tongue, a rack along one edge of said slot, a mounting carried by said tongue, a drive shaft rotatably carried by said mounting and extending horizontally, a vertical driven shaft rotatably mounted through said mounting and extending downwardly therefrom, means for transmitting rotary motion from the drive shaft to the driven shaft, and a pinion carried by the lower end of said driven shaft and disposed within the slot and meshing with the rack for imparting swinging adjustment to the tongue when the driven shaft is rotated.

FRANK ZUGER.